United States Patent [19]
Robinson

[11] 4,365,124
[45] Dec. 21, 1982

[54] PRESSURE SENSITIVE MACHINE SAFETY SWITCH

[76] Inventor: Charles E. Robinson, 208 Gardner Ave., Burlington, Wis. 53105

[21] Appl. No.: 205,487

[22] Filed: Nov. 10, 1980

[51] Int. Cl.³ .............................................. H01H 35/34
[52] U.S. Cl. ................. 200/81.5; 200/81 H; 200/86.5; 200/83 Q
[58] Field of Search .............. 137/513.3, 513.5, 513.7; 251/57; 60/534, 545, 567, 591; 200/81 R, 81 H, 81.4, 81.5, 83 R, 83 T, 83 Q, 83 Y, 83 Z, 85 R, 85 A, 86 R, 86 A, 86.5; 307/116, 118

[56] References Cited

U.S. PATENT DOCUMENTS

| | | | |
|---|---|---|---|
| 3,043,933 | 7/1962 | Weinfurt | 200/81.5 |
| 3,091,676 | 5/1963 | Koster | 200/81.5 |
| 3,548,201 | 12/1970 | Ive | 307/116 |
| 3,620,016 | 11/1971 | Wright | 60/567 |
| 3,995,127 | 11/1976 | Yanagi | 200/81 R |
| 4,073,311 | 2/1978 | McGeachy | 137/513.3 |

FOREIGN PATENT DOCUMENTS 262429  6/1968  Austria .............................. 200/83 Z

*Primary Examiner*—G. P. Tolin
*Attorney, Agent, or Firm*—Wheeler, House, Fuller & Hohenfeldt

[57] ABSTRACT

A pneumatic or hydraulic pressure sensitive safety switch circuit which transmits an impulse from a sensor to a distant electrical switch, via an operating fluid, to activate the electrical switch. The electrical switch may be a disabling switch for a dangerous machine from which sensed objects are to be protected. Check valves located in the conduits communicating between the sensors and the actuators for the electric switch allow the disabling switch to be quickly actuated, but prevent re-entry of the operating fluid into the sensor means to deactuate the disabling switch until a short time interval has elapsed. The safety switch thus is quickly actuated and slowly deactuated.

5 Claims, 2 Drawing Figures

PRESSURE SENSITIVE MACHINE SAFETY SWITCH

TECHNICAL FIELD

The present invention is a pneumatic or hydraulic pressure sensitive safety switch actuator circuit. The circuit trips a remote electrical machine disabling switch responsive to the application of pressure to a sensor positioned near a dangerous part of the machine. The purpose of such devices is to protect a person or thing which comes too close to a dangerous machine or area.

BACKGROUND ART

Pressure sensitive pneumatic switch actuator circuits of the type which actuate a remote electrical switch are well known. One example of such means is the familiar pneumatic circuit used in automobile service stations to signal the presence of an automobile to be serviced. Another example of such a circuit is a traffic counter having a hose which is stretched across a highway to detect the number of cars passing a given point. A third example is the pneumatic bilge pump actuator circuit taught in U.S. Pat. No. 3,091,676, issued to Koster on May 28, 1963.

In each of these known applications, a deformable, fluid filled sensor is deformed when it is contacted by a sensed object (such as water or an automobile). Part of the fluid in the sensor then flows out of the sensor and into a conduit as a pulse of increased pressure. This impulse is transmitted through the conduit to switch actuating means with a closed interior cavity having as one wall a pressure sensitive diaphragm. The pulse transmitted by the conduit into the closed interior cavity displaces the diaphragm outward into contact with the switch lever of an electrical switch which is then actuated. Thus, an impulse is transmitted by non-electrical (hydraulic or pneumatic) means to a remote electric switch to operate the switch.

One advantage of this system is that it keeps electrical switches and wires away from the sensed object. This extends the life of the electrical parts of the system while keeping electricity away from the point of actuation of the safety switch. This system is especially useful in applications where the presence of electrical current is hazardous, as near explosive vapors or highly combustible materials.

The fluid circuit described above does not quickly actuate the electrical switch and release the actuated switch after a time delay. These actuators therefore are not good safety switches. The Koster system described above is not designed to act as a safety switch. In Koster, a flow restrictor 26 is placed in the conduit to restrict the flow of fluid in either direction within the conduit. The stated purpose of the fluid restrictor of Koster is to prevent actuation of the electrical switch by a momentary pressure. Thus, the Koster system is clearly unsuitable for a safety switch actuator which upon even a momentary touch of the sensor must immediately actuate the disabling switch to prevent danger to the sensed object or person.

U.S. Pat. No. 3,548,201, issued to Ive on Aug. 8, 1968, discloses a machine safety switch. In Ive, the sensor is a floor mat or the like containing a conduit through which a constant flow of fluid is maintained. Stepping or otherwise pressing on the mat constricts the conduit, thus reducing the fluid pressure downstream of the mat. Fluid pressure sensing means located downstream of the mat detects this change in fluid pressure and trips a relay which disables the machine. Unfortunately, Ive provides a drastic disabling system in that the relay which is actuated to disable the machine must be reset from a location remote from the sensor. Thus, even a momentary actuation of the safety system shuts down the machine for an indefinite time until the relay can be reached and reset. After the danger is long past, the machine remains disabled. This is particularly a problem when the person who is likely to actuate the sensor is unfamiliar with the machine which is protected, and thus unable to restart the machine.

It is thus an object of the present invention to provide a fluid operated safety switch which is actuated suddenly to disable a machine, and which reenables the machine to operate after a shoft interval of time has passed.

Other objects of the invention will become apparent from the description which follows.

BRIEF DESCRIPTION OF THE INVENTION

The present invention is an improved fluid operated pressure sensitive safety switch comprising sensor means, switch actuating means remote from the sensor means, a conduit connecting the sensor and switch actuating means, switch means positioned to be actuated by the switch actuating means, and check valve means in the conduit means. The sensor means, switch actuating means, conduit means and switch means perform their known functions as described above.

The check valve means is new, and allows the fluid in the switch actuator circuit to freely flow toward the switch actuator means, but restricts the flow of fluid toward the sensor means. As a result of this improvement, the pressure sensitive switch is rapidly actuated at the time contact is made with the sensor means, and remains actuated for as long as contact continues. But the check valve is not completely fluid tight with respect to reverse flow, so the machine is enabled to restart a short time after the sensor means is no longer contacted by the sensed object.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

Figure 1:
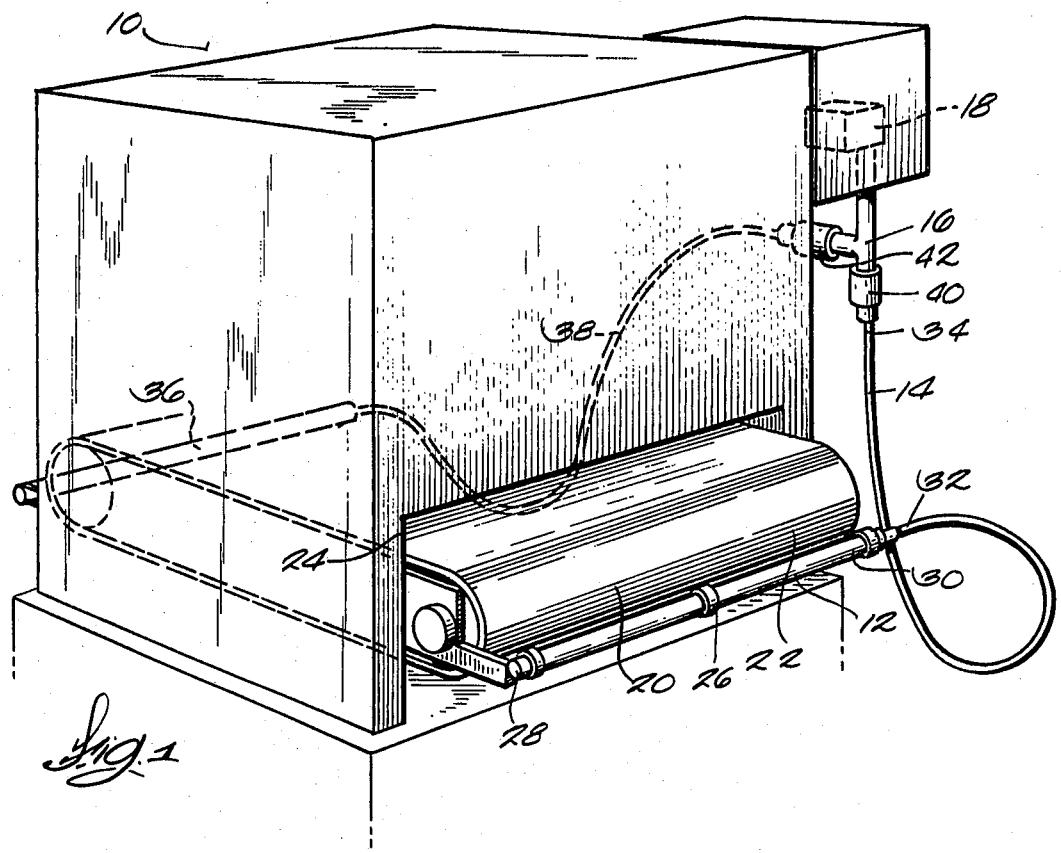
FIG. 1 is a perspective view of a pressure sensitive switch actuator circuit of the present invention, mounted on a representative machine.

Referring first to FIG. 1, a machine 10 is shown, to which are mounted plural sensor means such as 12 which are connected via conduits such as 14 and a manifold 16 to a housing 18 which contains switch actuating means and a switch which is actuated to disable machine 10 when sensor means 12 is contacted. Sensor means 12, conduit 14, manifold 16 and the switch actuator and switch within housing 18 thus define the pressure sensitive switch actuator circuit of the present invention.

Representative machine 10 is here shown to be an automatic sander. The sander has an exposed feed belt 20, which is an endless moving belt having an upper surface 22 which moves toward aperture 24 to feed objects into the interior of the machine. It is important to keep the operator of the machine and any inattentive persons away from exposed feed belt 20 in order to avoid feeding a person's arm, fingers or clothes into machine 10. Thus, a pressure sensitive safety switch actuator circuit is provided to disable the machine when necessary. Obviously, the exact form of representative machine 10 is of no consequence to the present invention. Machine 10 could equally be any hazardous thing which can be disabled electrically.

Sensor means 12 is a hollow elongated cylindrical tube which is mounted fairly close to machine 10 by suitable brackets such as 26. Sensor means 12 has a first end 28 which is plugged or provided with an end wall to render it fluid impervious. The second end 30 of sensor 12 is connected to the first end 32 of conduit 14, while the second end 34 of conduit 14 is connected to manifold 16. Sensor means 12 is essentially fluid tight except at its point of connection to conduit 14.

In this embodiment of the invention, a second sensor means 36 and conduit 38 are connected in the same way as above to manifold 16 to provide a second sensor to operate the same switch actuator.

Interposed between the manifold 16 and conduits 14 and 38 are check valves 40 and 42. Check valves 40 and 42 are oriented to allow an operating fluid, usually air, to freely pass from conduits such as 14 to manifold 16, but to restrict the flow of the operative fluid from manifold 16 to either conduit.

Figure 2:
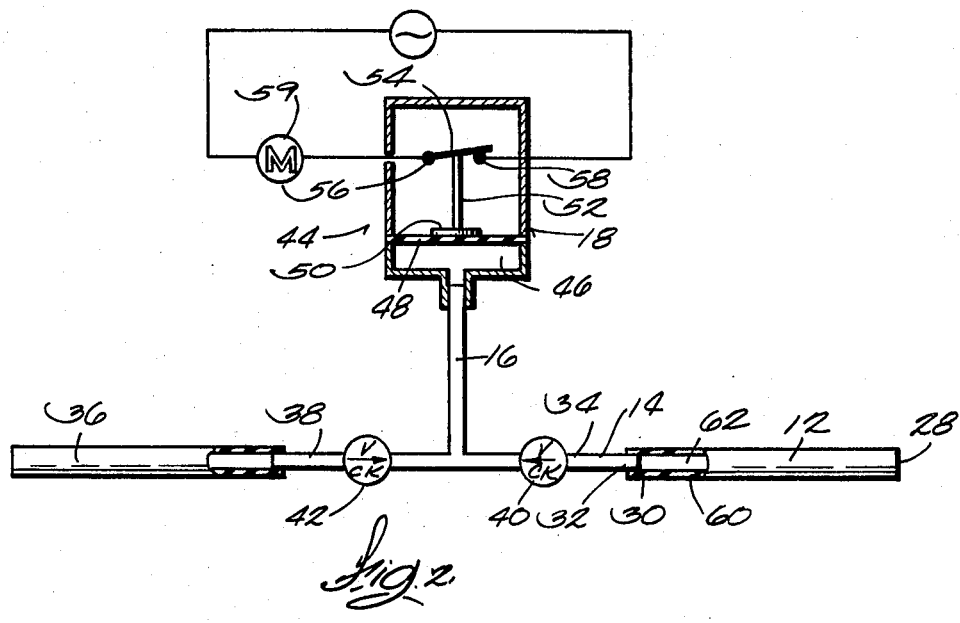
FIG. 2 is a schematic representation of a fluid circuit and an electrical circuit for a preferred pressure sensitive switch actuator of the present invention.

FIG. 2 shows in greater detail the pneumatic (or hydraulic) and electric circuits which are central to the function of the disabling switch and switch actuator. Switch actuating means 44 comprises a fluid filled interior cavity 46, here filled with a gas such as air (although means 44 could easily be filled with any gas or liquid). A diaphragm 48 forms one wall of cavity 46. Responsive to an increase of pressure within interior cavity 46, the central reinforced portion 50 of diaphragm 48 is displaced upward. This upward motion is transmitted by a plunger rod 52 to pivoting switch lever 54, which pivots around fixed contact 56 to break the electrical connection between contacts 56 and 58. Machine 10 is thus disconnected from the line current which energizes it, and the electrically operated parts of machine 10 such as motor 59 thus are disabled when a pressure increase is felt in fluid filled interior cavity 46. The disabling switch can alternately be a normally open switch which operates a brake or other active electrically operated safety device when the switch is closed.

The pressure within fluid filled interior cavity 46 is increased by pressure against sensor 12, which deforms the side wall 60 thereof inward to reduce the volume of interior cavity 62 within sensor 12. This forces a pulse of the operative fluid into conduit 14, through check valve 40, into manifold 16, and then into fluid filled interior cavity 46, thus causing diaphragm 48 to actuate the disabling switch. Since check valves guard both entrances to manifold 16, once the disabling switch is actuated it remains actuated until the pressure within fluid filled interior cavity 46 is somehow released.

In a highly preferred embodiment of the present invention, check valves 40 and 42 do not provide a perfect seal against the flow of air from manifold 16 into conduits 14 and 38, so that after sensor means 12 is deformed, it is slowly refilled to its original volume by fluid draining backward through check valve 40. Thus, the disabling switch is actuated for a period of time, but then resets itself to allow the machine to be restarted. However, so long as sensor means 12 remains deformed, for example, for as long as an object or person presses against sensor means 12, the machine cannot restart, since the fluid circuit as a whole is fluid tight. The safety switch thus disables the machine for so long as any of the sensor means detects a sensed object, and reenables the machine to operate shortly after the sensed object is removed from sensor means 12. This delayed reenablement of the machine not only provides further protection to the sensed object, but also prevents the safety switch from being used casually as an on-off switch for the machine. This time delay also creates an audible and visual interruption in the operation of a machine, and thus draws attention to the person or thing which actuated the sensor means.

In order to provide maximum sensitivity for the disabling switch actuator circuit of the present invention, sensor means 12 should have a relatively large volume and its side wall 60 should be deformable by a light contact to reduce the volume of interior cavity 62. On the other hand, the volume within conduit 14, manifold 16, and fluid filled interior cavity 46 should be relatively small, and the walls thereof should be relatively rigid in order to transmit the impulse from sensor means 12 reliably to diaphragm 48 in order to actuate the disabling switch.

I claim:

1. In a fluid operated pressure sensitive safety switch for a machine comprising:
   A. sensor means with a first fluid filled interior cavity having a pressure sensitive wall which can be displaced by a slight pressure to reduce the volume of said first cavity;
   B. switch actuating means with a second fluid filled interior cavity having as one wall a pressure sensitive diaphragm which is displaced outward by an influx of fluid into said second cavity;
   C. fluid filled conduit means connecting said first cavity to said second cavity; and
   D. disabling electrical switch means to disable said machine responsive to outward displacement of said diaphragm;
the improvement wherein said safety switch further comprises:
   E. check valve means in said conduit means allowing fluid to freely flow through said conduit toward said second cavity while restricting the flow of said fluid through said conduit toward said first cavity.

2. The safety switch of claim 1, wherein plural sensor means, each having its own conduit means and check valve means, communicate with said switch actuating means.

3. The safety switch of claim 1, wherein said fluid is air.

4. The safety switch of claim 1, wherein said sensor means comprises an elongated fluid-filled cylindrical tube with a deformable side wall.

5. The safety switch of claim 1, wherein said check valve means allows a restricted flow of fluid toward said first cavity after said switch is actuated, allowing relatively slow drainage of said second cavity into said first cavity, whereby to deactivate said switch automatically a short time after said actuation occurs.

* * * * *